United States Patent [19]

Forsberg et al.

[11] Patent Number: 5,749,309
[45] Date of Patent: May 12, 1998

[54] PROCESS AND APPARATUS FOR THE THERMAL PRODUCTION OF ENERGY FROM WASTE MATERIAL, PARTICULARY REFUSE

[75] Inventors: Stefan Forsberg, Obfelden; Hans Rüegg, Wohlen, both of Switzerland

[73] Assignee: Von Roll Umwelttechnik AG, Zurich, Switzerland

[21] Appl. No.: 439,126

[22] Filed: May 11, 1995

[30] Foreign Application Priority Data

May 16, 1994 [CH] Switzerland ............ 01510/94

[51] Int. Cl.⁶ .................................................. F23G 5/00
[52] U.S. Cl. ........................................ 110/346; 110/230
[58] Field of Search ................................ 110/229, 230, 110/231, 248, 346, 348

[56] References Cited

U.S. PATENT DOCUMENTS

| | | | |
|---|---|---|---|
| 1,886,064 | 11/1932 | Steinmuller | 110/230 |
| 3,334,599 | 8/1967 | Tanner | 110/346 X |
| 3,871,286 | 3/1975 | Henriksen | |
| 5,245,936 | 9/1993 | Nakata | |
| 5,261,337 | 11/1993 | Orita et al. | 110/346 |

FOREIGN PATENT DOCUMENTS

| | | |
|---|---|---|
| 0 595 067 | 5/1994 | European Pat. Off. |
| 1 751 133 | 4/1976 | Germany |
| 3 813 817 | 11/1989 | Germany |
| 4 031 493 | 4/1992 | Germany |
| 58-37415 | 3/1983 | Japan ............ 110/231 |
| 871 604 | 6/1961 | United Kingdom |
| WO 93/17280 | 9/1993 | WIPO |

*Primary Examiner*—John T. Kwon
*Attorney, Agent, or Firm*—Oblon, Spivak, McClelland, Maier & Neustadt, P.C.

[57] ABSTRACT

Waste material is conveyed in an uncomminuted state on a grate (5) through a combustion chamber (12) of a stationary furnace (10) and at the same time mixed by a thrust and shearing action of the grate (5). A gaseous oxidizing agent is introduced, for example via gas lances, into the combustion chamber (12) from above the layer of waste material (11) lying on the grate (5). The oxidizing agent cooperates with the combustible volatile substances escaping from the waste to form flames. The layer of waste is heated by the thermal radiation of the flames such that degasification occurs. The combustible gases thus freed are partially burnt. The waste material freed from the volatile substances, that is to say refuse coke, and the unburnt volatile substances, that is to say combustible gases, can be used as fuels outside the plant or within the plant. The oxidizing agent does not come into contact with the thermally stressed parts of the plant. It is thus possible to use oxidizing agents having a high oxygen content of up to 100%. This results in an enormous reduction of flue gases by up to 80%.

18 Claims, 2 Drawing Sheets

PROCESS AND APPARATUS FOR THE THERMAL PRODUCTION OF ENERGY FROM WASTE MATERIAL, PARTICULARY REFUSE

BACKGROUND OF THE INVENTION

1. Field of the Invention

The invention relates to a process and apparatus for the thermal production of energy from waste material, particularly refuse, wherein the waste material is arranged in a layer on a grate and conveyed together with the latter through a combustion chamber with simultaneous mixing of the layers of waste by the grate, and wherein a gaseous oxidizing agent is fed to the combustion chamber.

2. Description of the Related Art

Waste is treated in this way, for example, in conventional refuse incinerating plants. The refuse is conveyed on a combustion grate through the combustion chamber with the aid of movable grate blocks and is thereby dried and burnt. The oxidizing agent used is air, which flows from bottom to top through the combustion grate having the waste materials lying thereon. That part of the waste which has reached ignition temperature is ignited, and the flue gases thus liberated are conveyed into a secondary combustion chamber, where secondary air is added for the complete combustion of the flue gases. In the ideal case all the organic fractions of the refuse are converted into carbon dioxide and water by this method of combustion.

After the combustion, the slag produced is cooled and transported to a slag dump or for further processing. After the secondary combustion, the flue gases are generally passed through a heat exchanger, in which the heat produced is partly recovered, before they are passed on to downstream units for cleaning.

The above described conventional refuse incineration has certain disadvantages. Through the use of air as oxidizing agent and the consequent complete combustion, an amount of approximately 5000 to 6000 m$^3$ of flue gases per tonne of refuse is normally obtained. These flue gases must undergo expensive purification so that they can be emitted into the atmosphere. Plants for flue gas purification and heat recovery must be made correspondingly large and are technically demanding. Investment costs for such plants are correspondingly high.

Another disadvantage of this process consists in that, as the air flows through the combustion grate and through the layer of waste, dust and incompletely burnt particles of soot and ash are whirled up and are entrained by the flue gases into the downstream units. In the latter they form deposits which lead to problems, particularly in the recovery of heat. The deposits impair heat transfer and give rise to corrosion on the heat exchanger surfaces, which leads to expensive overhaul work and in addition lowers the efficiency of the plant.

Because of the materials of the grate blocks which can be used, the combustion temperatures cannot be freely selected. The achievable residence time of the waste in the combustion chamber is moreover limited and dependent on the possible size of the combustion grate. This has a negative effect on the quality of the slag. Because the combustion temperature and the residence time of the waste on the combustion grate cannot be freely selected, complete combustion of the slag is not ensured, and elutable inorganic noxious matter is partly retained in the slag.

In order to solve these problems in the above-described known refuse incineration process, various alternative processes have been developed, but these still have serious disadvantages.

To raise the combustion temperature and reduce the amount of flue gas, and consequently also the size and investment cost of the units installed downstream, the air for combustion flowing through the combustion grate was enriched with oxygen. However, this process does not lead to manageable temperatures on the combustion grate. A relevant reduction in the amount of flue gas therefore cannot be achieved, and the thermal and mechanical loads on the grate are increased.

In addition to refuse incineration, another known thermal process for producing energy from waste is degasification, also called pyrolysis, low-temperature carbonization or coking (see in this regard Fachzeitschrift Müll und Abfall 12/1978).

In all processes based on degasification, the waste is heated in the absence of oxygen. The organic compounds in the waste then become unstable, volatile constituents escape and non-volatile fractions are converted into coke.

Because degasification must take place in the absence of oxygen, in processes known hitherto the energy required for the endothermic process is supplied to the waste via heating surfaces which must be in direct contact with the waste. Examples of such heating surfaces are rotary tubes or ducts, which are either heated from outside or provided with internal heating tubes. Because of the poor thermal conductivity of the waste, pretreatment and comminution of the waste are indispensable before the actual degasification process. Because of the contact between the abrasive refuse and the heating surfaces, the mechanical parts need expensive servicing.

Other known thermal processes are based on the melting of the waste, combined with degasification or gasification. In these processes, shaft furnaces, such as are known in the production of pig iron, are almost exclusively used as the main equipment. However, it is known from the production of iron that a shaft furnace can be operated without problems only if a homogeneous structure of the material to be melted is ensured. A heterogeneous fuel such as domestic refuse does not consist of such homogeneous pieces, even after pretreatment. This leads to bridging in the shaft furnace and to the formation of larger agglomerates. The area of solids necessary for the gas-solid reaction is thus reduced and the oxidation of the organic materials is not ensured. This has the consequence that the incompletely burnt organic constituents are enclosed in the molten material and thus can no longer oxidize. Fractures occur in the subsequent cooling and granulation of the molten material, and at these points the non-oxidized residues appear. The production of an inert slag is therefore not ensured.

SUMMARY OF THE INVENTION

It is an object of the present invention to provide a process and apparatus of the type previously mentioned, in which the abovementioned disadvantages are eliminated and the amount of flue gas is considerably reduced.

According to the invention, this and other objects are achieved in that the gaseous oxidizing agent is introduced into the combustion chamber from above the layer of waste lying on the grate and there forms flames with combustible volatile substances liberated from the waste material by means of radiant heat, the flames supplying the radiant heat for the liberation of the combustible volatile substances, and the waste material freed from combustible volatile substances being obtained in the form of refuse coke, while the unburnt volatile substances are obtained in the form of combustible gas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings in which.

DETAILED DESCRIPTION OF THE PREFERRED EMBODIMENT

Figure 1:
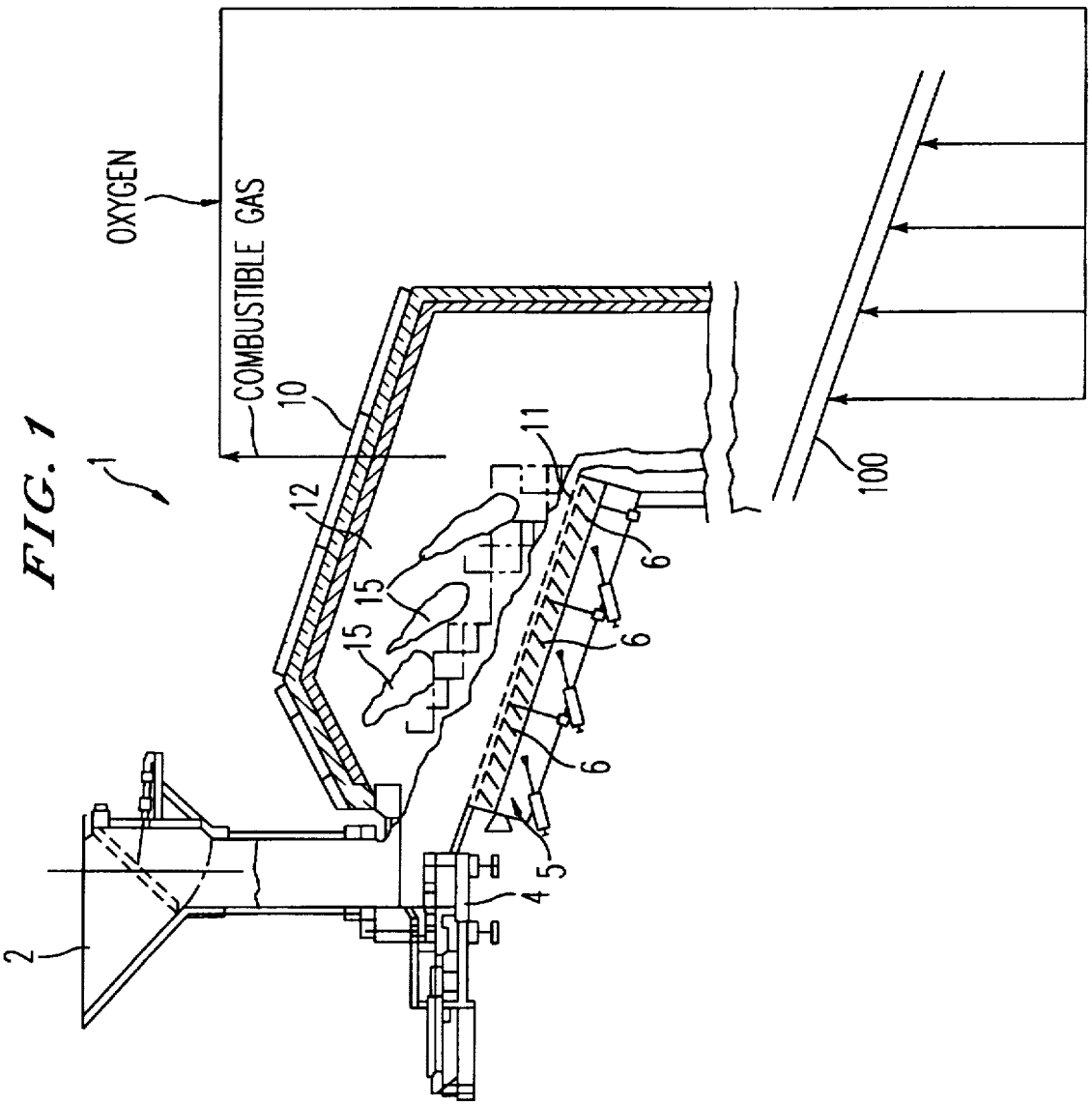
FIG. 1 is a schematic sectional; view of a waste disposal plant according to the invention.
Figure 2:
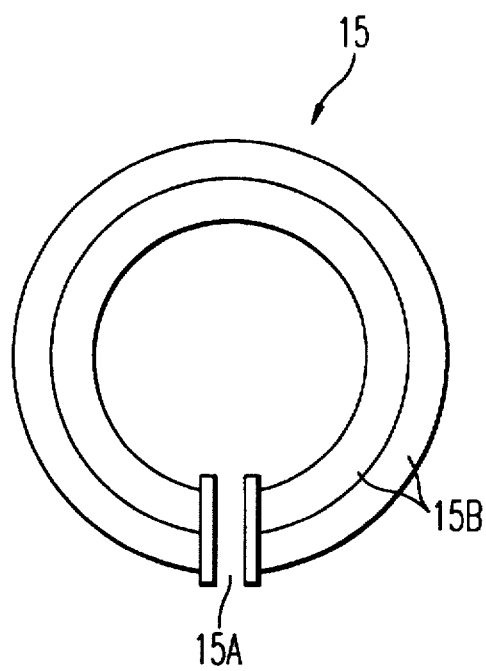
Fig. 2 is a section through a water cooled tube having radial bores.

A waste disposal plant is designated 1 in FIG. 1. The waste to be treated, for example refuse, is filled, without being comminuted, into a filling hopper 2 in a manner which is not illustrated in detail, and with the aid of a batching ram 4 arranged at the bottom end of the filling hopper 2 is pushed onto a grate 5. With each forward stroke of the batching ram 4 the same amount of refuse is fed to the grate 5. It is preferable for the rate of feed to be controlled in an infinitely variable manner.

The waste material is conveyed on the grate 5 through a stationary furnace 10. The layer of waste lying on the grate 5 is designated 11 in the drawing. Above the grate 5 and the layer of waste 11 the furnace 10 has a combustion chamber 12. In the combustion chamber 12 are distributed a plurality of elements 15 for the supply of a gaseous oxidizing agent. The elements 15 may preferably be in the form of gas lances, nozzles or tubes provided with radial bores 15A. They may have cooling jackets 15B so that they may be water cooled.

The grate 5 consists of three block-like grate elements 6 which in turn comprise a plurality of exchangeable grate blocks capable of being driven separately. Each grate element 6 is provided with a plurality of surfaces which are movable relative to one another and have a staircaselike configuration, and which exert a thrust and shearing action on the waste material so that new surfaces of the waste are continually subjected in the combustion chamber 12 to the thermal treatment described further on. The grate 5 is conventional and could be that used in the R-Grate refuse combustion system manufactured by Von Roll AG of Switzerland.

The oxidizing agent introduced into the combustion chamber 12 from above the layer of waste 11 lying on the grate 5 cooperates with the combustible volatile substances escaping from the waste to form flames, said flames heating the layer of waste 11 by thermal radiation to such an extent that degasification takes place. The waste material free from the volatile combustible substances becomes refuse coke. The volatile substances are partly burnt; unburnt volatile substances exist as combustible gas. These two degasification products constitute energy carriers, which can be used elsewhere as fuels.

Because of the very high burning speed of the flames, diffusion of the oxidizing agent into the waste is prevented and pure degasification is ensured. The layer of waste, which has poor thermal conductivity, acts as an insulation to protect the grate 5 against thermal radiation or heat transmission. The oxidizing agent does not come into contact with the thermally stressed parts of the plant and thus it is possible to use oxidizing agents having an oxygen content between 10 and 100%, preferably 50 to 100%, and in particular oxygen alone, thereby achieving a reduction in the amount of waste gas by up to 80%.

The refuse coke and the residual combustible gases can be used as homogeneous fuels in an external plant (not shown in the drawing) for energy conversion. The refuse coke must first be freed of inert substances and the combustible gases be cleaned to remove dust and noxious matter. The degasification products, that is to say refuse coke and/or combustible gases, may however also be subjected to secondary combustion inside the plant, for example in a rotary tubular furnace or in a fluidized bed (not illustrated in the drawing).

The refuse coke may also be subjected to secondary combustion in a conventional manner on a downstream combustion grate 100. Since in the process according to the invention, as already mentioned, oxidizing agents having a high oxygen content are used and the amount of flue gas is reduced by up to 80% through the absence of atmospheric nitrogen, flue gas compositions having water vapor contents of up to 50% are obtained. It is known from the coal industry that a gas of this kind can be used as a gasification agent for carbon content reduction. If the downstream conventional combustion grate is now used for the secondary combustion of the refuse coke for the purposes of carbon content reduction, the flue gases can advantageously be recirculated and passed as a gasification agent through the combustion grate. Water vapor could of course also be used for this purpose.

The recirculated flue gases, enriched with the oxygen, may also be used as oxidizing agent in the combustion chamber 12.

Owing to the fact that in the process according to the invention the oxidizing agent (oxygen, gas, enriched recirculated flue gas, or air) is introduced from above the layer of waste 11, and not through the grate 5, into the combustion chamber 12, the whirling of the dust produced and the consequent disadvantages are avoided.

Because of the shearing action of the grate and the fact that new surfaces of the waste are continually subjected to thermal radiation, the heating-up time required is minimized in an advantageous manner. Through the advantageous use of the grate as an operationally reliable unit for treatment of waste, and as a result of the fact that no heating surfaces in direct contact with the waste are required for the degasification process, the need for pretreatment or comminution of the waste is eliminated.

The layer of waste 11 can be shaped or treated along the length of the grate 5 in the required manner because of the separate, regulable driving of individual grate blocks. The supply of oxidizing agent at individual elements 15, for example gas lances, can also be individually metered or the amount metered can be regulated.

Since only degasification takes place in the furnace 10 instead of complete combustion, and since the temperature can be efficiently regulated during the degasification process, the thermal stressing of the plant can also be kept low.

The reduction in flue gases is considerable; the waste disposal plant according to the invention is small and inexpensive, since no large and expensive apparatus is required for cleaning the flue gases.

Obviously, numerous modifications and variations of the present invention are possible in light of the above teachings. It is therefore to be understood that the invention may be practiced otherwise than as specifically described herein.

What is claimed as new and desired to be secured by Letters Patent of the United States is:

1. Process for the thermal production of energy from waste material, comprising the steps of:

arranging the waste material in a layer on a grate;

conveying the waste material on the grate through a combustion chamber while simultaneously heating and mixing the layers of waste via the grate without feeding a gaseous oxidizing agent through the grate, thereby liberating combustible volatile substances from the waste material; and feeding a quantity of a gaseous oxidizing agent into the combustion chamber from above the layer of waste on the grate, said quantity being such that the gaseous oxidizing agent cooperates with the combustible volatile substances liberated from the waste material to produce flames for radiantly heating the combustible volatile substances, thereby producing refuse coke free from combustible volatile substances and such that unburnt volatile substances remain in the form of combustible gas.

2. Process according to claim 1, wherein said feeding step comprises feeding the gaseous oxidizing agent into the combustion chamber via a plurality of elements distributed in the conveying direction of the waste material.

3. Process according to claim 2, wherein said feeding step comprises feeding the gaseous oxidizing agent through gas lances.

4. Process according to claim 2, wherein said feeding step comprises feeding the gaseous oxidizing agent through nozzles.

5. Process according to claim 2, wherein said feeding step comprises feeding the gaseous oxidizing agent through tubes provided with radial bores.

6. Process according to claim 2, wherein said feeding step comprises feeding the gaseous oxidizing agent individually dosed at each element.

7. Process according to claim 2, including the step of cooling the elements.

8. Process according to claim 1, including the steps of cleaning the produced combustible gas and using the cleaned combustible gas as fuel for external energy conversion.

9. Process according to claim 1, including the steps of freeing the refuse coke of inert substances and using the freed refuse coke as fuel for external energy conversion.

10. Process according to claim 1, including the step of at least partially burning at least one of the combustible gas and the refuse coke within the plant at a position downstream of the combustion chamber in the conveying direction.

11. Process according to claim 10, wherein said step of at least partially burning at least one of the combustible gas and the refuse coke within the plant at a position downstream of the combustion chamber in the conveying direction is performed on a downstream combustion grate.

12. Process according to claim 11, including the steps of enriching the combustible gas with oxygen and circulating the enriched gas through the downstream combustion grate.

13. Process according to claim 1 including the steps of enriching the combustible gas with oxygen and circulating the enriched gas through the combustion chamber.

14. Process according to claim 1, wherein the gaseous oxidizing agent has an oxygen content of 10 to 100%.

15. Process according to claim 1, wherein the gaseous oxidizing agent has an oxygen content of 50 to 100%.

16. Process according to claim 1, wherein the gaseous oxidizing agent has an oxygen content of 100%.

17. Process according to claim 1, wherein the waste material is refuse.

18. Process according to claim 1, including the step of mixing the waste material by using the grate to produce a thrust and shearing action on the waste material thereon.

* * * * *